United States Patent
Dorricott et al.

(10) Patent No.: US 6,374,038 B2
(45) Date of Patent: *Apr. 16, 2002

(54) TAPE RECORDING OF VIDEO SIGNALS

(75) Inventors: Martin Rex Dorricott, Basingstoke; Simon Chandler; Paul Michael McHugh, both of Bath, all of (GB)

(73) Assignees: Sony Corporation, Tokyo (JP); Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,616

(22) Filed: Apr. 9, 1997

(30) Foreign Application Priority Data

Apr. 12, 1996 (GB) .............................................. 9607644

(51) Int. Cl.[7] .............................................. H04N 5/911
(52) U.S. Cl. ........................ 386/113; 386/124; 360/32
(58) Field of Search ............................ 386/40, 46, 83, 386/81, 95, 124, 70, 125, 113; 360/32, 72.1, 72.2; 707/200, 205, 204

(56) References Cited

U.S. PATENT DOCUMENTS

| | | | |
|---|---|---|---|
| 4,797,752 A | * | 1/1989 | Giddings .................... 386/125 |
| 5,384,674 A | | 1/1995 | Nishida et al. |
| 5,541,738 A | * | 7/1996 | Mankovitz .................... 386/83 |
| 5,646,796 A | * | 7/1997 | Kimura et al. ............. 360/72.2 |
| 5,786,955 A | * | 7/1998 | Kori et al. ................. 360/72.1 |
| 5,805,763 A | * | 9/1998 | Lawler et al. ................. 386/83 |
| 5,949,593 A | * | 9/1999 | Shirakawa et al. ........... 386/70 |
| 5,949,953 A | * | 9/1999 | Shirakawa et al. ........... 386/70 |

FOREIGN PATENT DOCUMENTS

| | | |
|---|---|---|
| EP | 0 646 922 A2 | 4/1995 |
| GB | 2 075 792 A | 11/1981 |
| GB | 2 155 683 A | 9/1985 |
| GB | 2 195 490 A | 4/1988 |
| GB | 2 280 778 A | 2/1995 |
| GB | 2 323 240 A | 9/1998 |

* cited by examiner

Primary Examiner—Wendy R. Garber
Assistant Examiner—Christopher Onuaku
(74) Attorney, Agent, or Firm—Frommer Lawrence & Haug LLP; William S. Frommer; Bruno Polito

(57) ABSTRACT

A digital tape recorder comprises means for recording video material onto video sections of a digital tape; and means for recording digital cataloguing data corresponding to the video material onto cataloguing data sections longitudinally interspersed between video sections on the digital tape.

9 Claims, 2 Drawing Sheets

| Volume Info | Item 1 AV file | Item 2 GOP descriptor | Item 1 data file | Item 1 database details | Item 2 AV file | Item 2 GOP descriptor | Item 2 database details | . . . . | Contents list |
|---|---|---|---|---|---|---|---|---|---|
| File number: 1 | 2 | 3 | 4 | 5 | 6 | 7 | 8 | | n |

*Fig. 2*

TAPE RECORDING OF VIDEO SIGNALS

BACKGROUND OF THE INVENTION

1. Field of the Invention

This invention relates to tape recording video signals.

2. Description of the Prior Art

Most broadcasting stations archive the video material which they have acquired and/or prepared for transmission. This is particularly important for news-gathering organisations where there is often a need to include archived or library material in a current news story (e.g. in an obituary story).

Traditionally, the main mass storage medium suitable for video archiving has been video tape, more recently in cassette form. However, since each tape cassette holds only about two or three hours of video material, even storing only the broadcast output of a television station requires very many cassettes. If non-broadcast material is also archived, the required number of tapes increases dramatically.

Thus, cataloguing the tapes used for archiving video material is very important. Originally, a manual cataloguing system would have been used, but of course more recently catalogues based on computer databases have been developed. In such systems, the computer allows searches to be performed against stored key words or other information characterising each tape, and then indicates to a user which tape should be accessed to retrieve the required video material.

SUMMARY OF THE INVENTION

This invention provides a digital tape recorder comprising:

means for recording video material onto video sections of a digital tape; and means for recording digital cataloguing data associated with the video material onto cataloguing data sections longitudinally interspersed between video sections on the digital tape.

The invention recognises that in a computer database-oriented video tape cataloguing system, it is necessary to store the database entries for each tape on a rapid-access storage medium such as a computer hard disk to allow searching to be performed rapidly. However, the invention also recognises the potential problem of keeping a tape catalogue separate from the actual archived material, in that the catalogue can become corrupted or even lost through data errors or human mistakes. Also, the tape label (which previously would have been the only link between the tape contents and the record in the database catalogue) can be lost or attached to the wrong tape.

Therefore, to address these problems, a digital tape according to the present invention has cataloguing data stored digitally on the tape along with the corresponding video signals or video data.

This measure allows the contents of the tape to be identified from the digitally stored cataloguing data, even if the corresponding external database has become corrupted or the tape has been incorrectly labelled.

The skilled man may appreciate that in a helical scan tape recorder, longitudinally adjacent tracks or sections may in fact longitudinally overlap to some extent along the tape, but for the present purposes they are considered as disposed along the tape from one another.

Although the tape recorder may be (strictly speaking) a data recorder rather than a specifically designed video tape recorder, because the bulk of the data on a typical tape is video data, the tape recorder can be referred to as a video tape recorder and the resulting tapes can be referred to as video tapes.

Preferably, the digital cataloguing data stored on the tape is in a textual form which, when printed out, can be understood by a human reader. For example, ASCII characters could be encoded onto the tape to convey textual information about the tape's contents.

Preferably, however, the cataloguing data also provides the necessary data to rebuild a computer database entry for that video material. This would allow a database to be rebuilt in the case of data loss, and would also allow a tape created on one database system (for example by one broadcasting company or studio site) to be incorporated into a database cataloguing system maintained by another broadcasting company or studio site.

This invention also provides a video archiving system comprising:

a computer database defining database entries for video material sequences;

means for generating a database entry for a current video material sequence to be archived;

a digital tape recorder as defined above, for recording one or more archived copies of the current video material sequence; and means for generating cataloguing data to be recorded by the digital tape recorder from the database entry for the current video material sequence.

This invention also provides a digital tape on which video material and digital cataloguing data defining the video material are recorded in respective longitudinally interspersed sections of the tape.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 is a schematic diagram of the data format of a digital tape recorded by the apparatus of FIG. 1.

DESCRIPTION OF THE PREFERRED EMBODIMENTS

Figure 1:
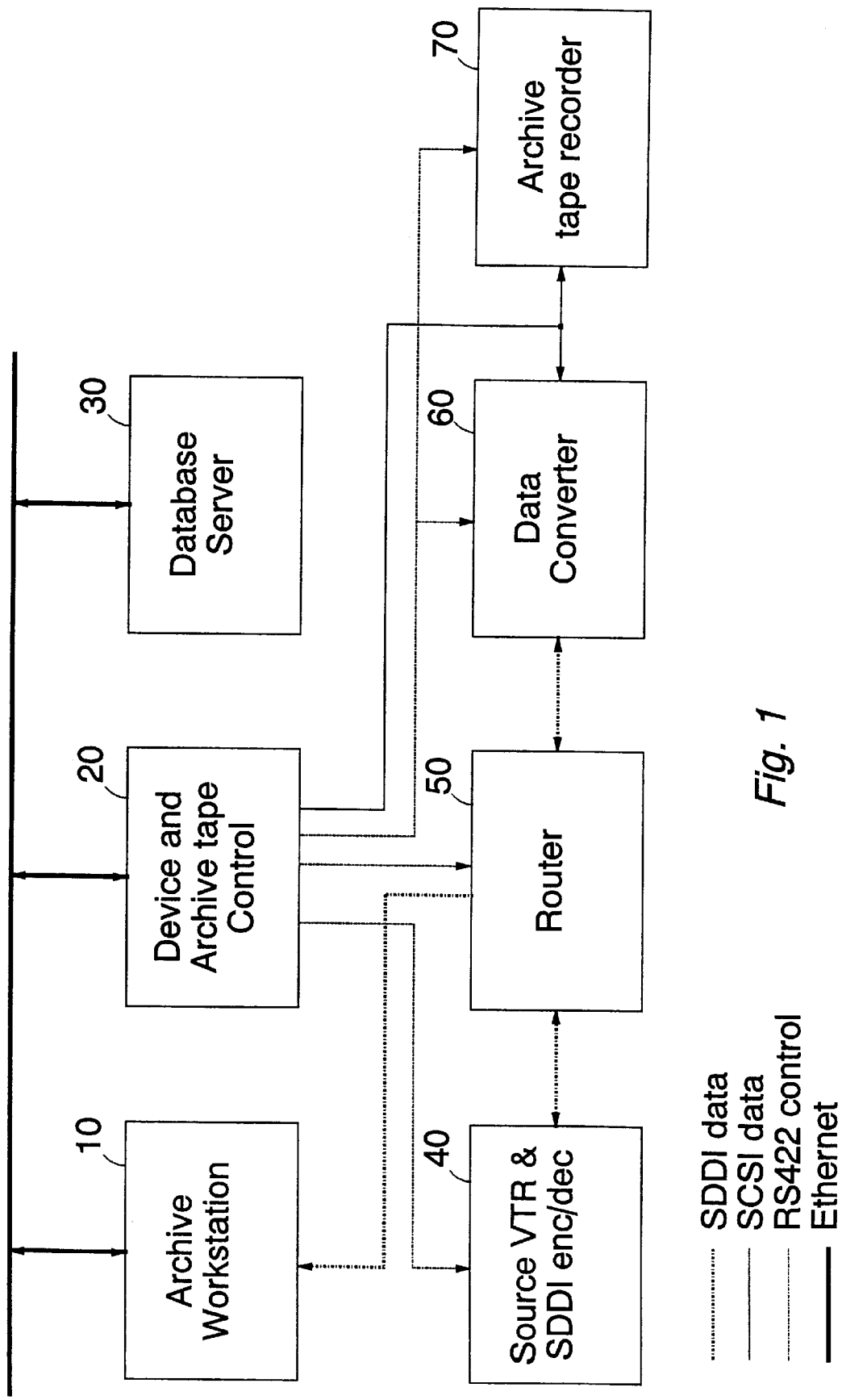
FIG. 1 is a schematic diagram of a video archiving system.

FIG. 1 is a schematic diagram of a video archiving system. The system comprises an archive workstation 10, a device control and archive tape control computer 20 and a database server 30, all linked by an ethernet local area network (LAN) connection, a source video tape recorder (VTR) 40, a router 50, a data converter 60 and an archive tape recorder 70.

The archiving system works in two main modes of operation. When incoming video material (with or without accompanying audio material) is to be archived, the material is replayed from the source VTR 40 and viewed at the archive workstation 10. A human operator (referred to as the archivist) then assigns a title, various keywords, an abstract and other information to the video material. This additional information forms a database entry which is stored in a database maintained on the database server 30. In the meantime, the video material is stored on the archive tape recorder 70. This "archive creation" process will be described in more detail below.

In a second ("archive retrieval") process, the human operator uses the archive workstation 10 (or another workstation connected to the network) to browse through the database entries held on the database server 30. For example, the user might be searching for video material having a particular associated keyword. When the user finds one or more pieces of video material in this manner which he believes are appropriate to the current requirements, he can schedule a retrieval operation to retrieve that video material from the archive tape recorder.

These two processes will now be described in more detail.

Archive Creation

In this mode of operation, incoming video material is replayed from the source VTR (for example, a Sony Digital BetaCam video tape recorder) and is encoded into a known compressed video format referred to as the "SDDI" format. The compressed video is supplied via the router 50 to the archive workstation 10, where it can be viewed by the archivist.

At this stage, the operation of the source VTR 40 and the routing applied by the router 50 are controlled by the device and archive tape control computer 20, which in turn responds to commands by the archive workstation 10. Thus, if the archivist wishes to replay a particular portion of the tape, he makes the appropriate commands at the archive workstation 10, which are communicated via the ethernet link to the device controller 20 and from there to the source VTR 40 using a conventional RS422 control protocol.

The archivist replays through the material to be archived, perhaps several times over to gain a full understanding and familiarity with the events covered by the video material. The archivist is presented with software-generated database entry forms on the screen of the archive workstation 10, at which the archivist can enter the following information:

Material Title; Material Keywords; People involved in production (credits), e.g. reporter, soundman etc; Material Abstract; One or more "shots" within the material, each shot being defined by a shot index number, a starting and ending timecode within the material, the Camera Action (e.g. close mid shot (CMS), mid shot (MS) etc), a shot abstract, shot keywords and the copyright owner for the shot.

This information forms a database entry to be added to a conventional database maintained on the database server 30.

When the database entry has been prepared, the video material is transferred from the source VTR 40, via the router 50 to the data converter 60. The data converter 60 receives the video data in the SDDI synchronous transmission format and outputs the video data to the archive tape recorder 70 in a SCSI data transfer format.

Because the nature of the SCSI transmission format does not tend to allow data transfer operations to be initiated and started quickly enough for a synchronous video data transfer, the data converter 60 contains a large buffer memory (not shown) to provide any necessary delay to the data being passed to or from the data converter 60.

The archive tape recorder itself is a helical scan digital tape recorder such as the Sony GY10 tape recorder. This device is primarily a "data" recorder, and so will accept data other than video data, but it is noted that in this embodiment the bulk of the material stored on the archive tape recorder is in fact video data.

The video data and certain other data to be described below with reference to FIG. 2 is then recorded on the archive tape recorder 70. Specifically, the video data is routed as described above from the source VTR 40, via the router 50 to the data converter 60 and finally to the archive tape recorder 70; and the other associated data (e.g. data derived from the database entry for that material) is routed from the database server 30 to the device and archive tape controller 20 via the LAN, and then from the device controller 20 to the archive tape recorder 70 via the SCSI link. The database information is generated by reciting the title, keywords and so on from the database entry for that material in a particular order to be described below, with each field being marked by field markers /* (field start) and, where appropriate, */ (field end).

In a typical application, there is a very large amount of video data to be archived in this way, so a robotic library system may be used in associated with the archive tape recorder 70. In any event, whether a robotic or a manual library system is used, it is very likely that a large number of tapes will be required, and so the database entry for the video material archived on a particular tape (which is stored in the database server 30) also contains a tape identifier which identifies the appropriate tape (or tapes, if multiple copies are made) on which that material is stored.

Archive Retrieval

The first step in an archive retrieval operation is to identify the appropriate piece of video material to be retrieved. The user can do this by browsing through the database stored on the database server 30 from a computer workstation (such as the archive workstation 10) connected the ethernet link to the database server 30. This searching mechanism may be conventional, using key words, title information or abstract text to search for a required piece of video material.

Once the required material has been identified, the user can issue a command to be executed by the device and archive tape control computer 20 to retrieve the required video data from the archive tape recorder 70.

In general, in a typical system these commands will have to be queued and then executed in a priority order.

When a command is executed to retrieve data from the archive tape recorder, it is first necessary to have the correct tape placed in the archive tape recorder 70 (e.g. by the robotic library system—not shown). Then, the device and archive tape control computer 20 sets up the SCSI link from the archive tape recorder to the data converter and issues appropriate RS422 commands to the archive tape recorder, the data converter, the router and to the source VTRs 40 so that the video data is replayed from the archive tape recorder 70, communicated via the SCSI link to the data converter 60, converted into an SDDI synchronous transmission format, and then supplied via the router 50 to the source VTR 40 for recording. The material can then be viewed, either during this process or later from the source VTR, at one of the computer workstations.

FIG. 2 is a schematic diagram illustrating the data format of an archive digital tape recorder by the archive tape recorder 70 of FIG. 1.

The archive digital tape is divided into successive "files", longitudinally separated from one another by an "end of file" markers recorded onto the tape.

In the example shown in FIG. 2, file number 1 is a volume identifier for the whole tape cassette. Files 2 to 5 refer to one piece of archive video material, files 6 to 8 refer to another piece of archive video material and so on through to the last file on the tape, file n which is a contents list for the whole tape.

Specifically, for each piece of archive video material, the first file is an "A/V" file containing compressed audio and video data relating to that material. This data is arranged as a single contiguous burst of video data containing the whole of the video data for that material, followed by a single contiguous burst of audio data containing the whole of the audio data for that material.

In order to be able to split the contiguous burst of video data into the appropriate data to be decoded for each GOP (group of pictures) on replay, the data corresponding to each GOP has to be identified. Therefore, the next file on the tape is a "GOP descriptor" which provides information defining boundaries between adjacent GOPs in the A/V file. This information is collated by the device controller as the video data is recorded and is then supplied to the archive tape recorder after the whole A/V file has been recorded.

In the audio data, the encoding/decoding technique is such that the audio data has a fixed data rate per frame of video, so that once the start of the audio data in the A/V file has been established (from the GOP descriptor relating to the last GOP in the video section) no further information about the audio data section is needed to decode the audio information.

There then follows zero or more optional data files, such as a script file (text) or an edit decision list (EDL) relating to the video material. Finally, for each piece of material, the database details for the database entry corresponding to that video material are stored in a database section of the tape. The next piece of video material follows after this.

The volume information ("volume info") file defines characteristics of the whole tape volume (in this example, cassette), and the contents list at the very end of the tape lists the type and identity of each file stored on the tape.

In normal operation, the database details stored on the tape are not referred to by the archive system of FIG. 1. However, if the information stored at the database server 30 becomes corrupted, or a tape is transferred from the system on which it was recorded to another archive system (where there will be no suitable database entry), a database entry for the material on the tape can be recreated from the database details stored between each file of audio/video material on the tape.

The volume info, the database details and the contents list are all encoded in, for example, ASCII text, and are created in a human-readable form (when printed out). Formal definitions and working examples of each file for the example of FIG. 2 are given below. In the formal definitions, the expression {digit}n signifies that the particular field is numeric (though expressed in alphanumeric form to be human readable), having n digits.

The volume info file is recorded when the tape volume is first initialised or set up. The database details interspersed between the A/V files may contain database information for other files (e.g. the last but one file) as well as details for the immediately preceding file. The contents list is read, updated and re-recorded at the end of the tape whenever a file is added to the tape.

| VolumeInfo | | |
|---|---|---|
| Volume Identifier:= | seq-num.date.time.licenceID | |
| where seq-num:= | {digit}16 - | a sequence number for that installation starting from 1; |
| Time:= | hour minute second - time of creation of volume; | |
| hour:= | {digit}2 | |
| minute:= | {digit}2 | |
| second:= | {digit}2 | |
| Date:= | Year Month Day - date of creation of volume; | |
| year:= | {digit}4 | |
| month:= | {digit}2 | |

-continued

| VolumeInfo | | |
|---|---|---|
| day:= | {digit}2 | |
| LicenceID:= | {digit}6 - | identifies the user of the system on which the volume was created; |

EXAMPLE

Volume Identifier="0000000000000001.19960331.195400.100001"

Provided the licence ID is unique to that user (as it should always be), and the counter seq-num is unique within the scope of the licence ID, then the volume identifier will be universally unique.

The volume identifier is also written on the outside of the tape in text and as a barcode.

Content List

This is a list of the contents of each file, expressed as the file number (file #), file type, date of creation of the file, a numerical identifier of the content, and title information where appropriate. This is best seen by reference to the following example. Here, the title line (starting "File# . . . ") may be included in the file or may be assumed.

EXAMPLE

Volume:=0000000000000001.19960331.195400.100001

| File# | Type | Date | ContentID | Content Title |
|---|---|---|---|---|
| 1 | VolID | 19960331 | | |
| 2 | A/V 4:2:2P@ML | 19960331 | 001234 | UN peace talks |
| 3 | GOP Descriptor | 19960331 | 001234 | UN peace talks |
| 4 | EDL | 19960331 | 001234 | |
| 5 | Database | 19960331 | | |
| 6 | A/V 4:2:2P@ML | 19960401 | 001235 | Queen visits Manchester |
| 7 | GOP Descriptor | 19960401 | 001235 | Queen visits Manchester |
| 8 | Database | 19960401 | | |

Here, the text defining the A/V file (4:2:2P@ML) is simply a code defining a data compression format (in this case, a type of MPEG 2 compression) used to encode the A/V file. The actual compression format can be conventional.

Database Example

This is an example of a database entry in the form in which it is recorded onto tape (as file 5 or file 8 above, for example). The examples are taken from the field of news-gathering, and relate to the two news stories mentioned in the examples above. In general, the order of sections in the example is maintained in each database entry on the tape in this embodiment, but since section headers are used (e.g. "content start", this requirement could be relaxed in other embodiments).

```
/*ContentStart 001234
    Title = "UN peace talks"
    Keywords = "UN", "peace talks", "War", "negotiations"
    Person = "Reporter" = "Martin Jones"
    Person = "Soundman" = "Phil Smith"
    /* AbstractNoteStart
    UN peace talks have started to try to resolve the conflict in .....
    ...... reached no conclusions but will continue.
    */ AbstractNoteEnd
```

-continued

```
/*ShotStart 00001
    /* StartTime = 00:01:23:12
    /* EndTime = 00:01:25:12
    /* CameraAction = "CMS"
    /* AbstractNoteStart
        Delegation enters Geneva Hotel......
        ......
    */ AbstractNoteEnd
    Keywords = "delegation", "hotel"
    Copyright = "International News plc"
/*ShotEnd
/*ShotStart 00002
    /* StartTime = 00:01:23:12
    /* EndTime = 00:01:25:12
    /* CameraAction = "MS"
    /* AbstractNoteStart
        Meeting breaks for lunch
        ......
    */ AbstractNoteEnd
    Keywords = "lunch"
    Copyright = "International News plc"
/*ShotEnd
/*ContentEnd
/*ContentStart 001235
    Title = "Queen visits Manchester
    Keywords = "Queen", "Manchester", "Visit"
    Person = "Reporter" = " ....
..
...
....
```

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A digital tape recorder comprising:
   (i) means for recording video material onto video sections of a digital tape, each said video section including a contiguous data section representing a plurality of video pictures which are compressed into a multiple of groups of pictures; and
   (ii) means for recording digital cataloguing data associated with said video material onto cataloguing data sections longitudinally interspersed between video sections on said digital tape such that said cataloguing data appears intermittenly on said tape and not within each track recorded on said tape, said cataloguing data including for each said video section a file recorded on said tape at a position following said video section and providing the information necessary for recreating a database entry concerning the material recorded on said digital video tape;
   whereby said file is stored in a database section of said tape and said file does not include a copy of said database entry.

2. A recorder according to claim 1, in which said cataloguing data comprises textual data comprising at least a title associated with said video material.

3. A recorder according to claim 1, in which said cataloguing data comprises an edit decision list associated with said video material.

4. A recorder according to claim 1, in which said cataloguing data comprises a script text file associated with said video material.

5. A recorder according to claim 4, in which said contents list is recorded substantially at one end of said tape.

6. A recorder according to claim 1, in which at least a part of said cataloguing data is recorded in an ASCII text format.

7. A recorder according to claim 1, comprising means for recording a contents list on said digital tape, said contents list comprising at least information defining the contents of each video section and each cataloguing data section on that tape.

8. A video archiving system comprising:
   (i) a computer database defining database entries for video material sequences;
   (ii) means for generating a database entry for a current video material sequence to be archived;
   (iii) a digital tape recorder according to claim 1 for recording one or more archived copies of said current video material sequence; and
   (iv) means for generating cataloguing data to be recorded by said digital tape recorder from said database entry for said current video material sequence.

9. A digital tape on which video material and digital cataloguing data defining said video material are recorded in respective longitudinally interspersed sections of said tape such that said cataloguing data appears intermittenly on said tape and not within each track recorded on said tape, said video material being made up of a plurality of video sections, each section including a contiguous data section representing a plurality of video pictures which are compressed into a multiple of groups of pictures, and said cataloguing data including for each said video section a file recorded on said tape at a position following said video section and providing the information necessary for recreating a database entry concerning the material recorded on said digital video tape;
   whereby said file is stored in a database section of said tape and said file does not include a copy of said database entry.

* * * * *